(12) United States Patent  
Zeidler

(10) Patent No.: US 9,561,452 B2  
(45) Date of Patent: Feb. 7, 2017

(54) PROCESS AND APPARATUS FOR TREATING DRILLING FLUID

(71) Applicant: H. Udo Zeidler, Calgary (CA)

(72) Inventor: H. Udo Zeidler, Calgary (CA)

( * ) Notice: Subject to any disclaimer, the term of this patent is extended or adjusted under 35 U.S.C. 154(b) by 0 days.

(21) Appl. No.: 14/401,591

(22) PCT Filed: Feb. 20, 2014

(86) PCT No.: PCT/CA2014/050116
§ 371 (c)(1),
(2) Date: Nov. 17, 2014

(87) PCT Pub. No.: WO2014/127477
PCT Pub. Date: Aug. 28, 2014

(65) Prior Publication Data
US 2015/0336030 A1    Nov. 26, 2015

Related U.S. Application Data

(60) Provisional application No. 61/766,865, filed on Feb. 20, 2013, provisional application No. 61/824,186, filed on May 16, 2013.

(51) Int. Cl.
*B01D 21/01*     (2006.01)
*B01D 21/26*     (2006.01)
(Continued)

(52) U.S. Cl.
CPC ............ *B01D 21/01* (2013.01); *B01D 21/262* (2013.01); *C09K 8/00* (2013.01); *E21B 21/062* (2013.01);
(Continued)

(58) Field of Classification Search
CPC ...... E21B 21/06; E21B 21/062; E21B 21/063; E21B 21/065; E21B 21/068; B01D 21/01; B01D 21/262; B01D 2221/04; C09K 8/00; C09K 8/32; C09K 8/36
See application file for complete search history.

(56) References Cited

U.S. PATENT DOCUMENTS 4,482,459 A * 11/1984 Shiver .................... B01D 36/00
                                                               210/639
5,128,046 A *  7/1992 Marble ................. E21B 21/063
                                                               166/267

(Continued)

FOREIGN PATENT DOCUMENTS

CA        2533953 A1     7/2007
CA        2533953 C     11/2011
(Continued)

OTHER PUBLICATIONS

Haliburton, "Barite: Heavyweight Additive" Product sheet, (2007), 2pgs.*

*Primary Examiner* — Lucas Stelling
(74) *Attorney, Agent, or Firm* — Paul & Paul

(57) ABSTRACT

A process for treating drilling fluids which are used during the process of drilling for fossil fuels includes providing a drilling fluid having a continuous hydrocarbon phase, a discontinuous aqueous phase, and a discontinuous solid phase, a polymer solution, at least one coagulant, water, and oil, the oil and water being provided in a volume ratio being from 0.7 to 1.3 times the oil-to-water volume ratio of the drilling fluid. The drilling fluid is mixed with the coagulant, the polymer solution, the oil, and the water in any order to provide an input fluid. The mixture is centrifuged to separate solid materials from the input fluid to provide a treated drilling fluid.

21 Claims, 4 Drawing Sheets

(51) Int. Cl.
*C09K 8/36* (2006.01)
*E21B 21/06* (2006.01)
*C09K 8/00* (2006.01)

(52) U.S. Cl.
CPC ........... *E21B 21/065* (2013.01); *E21B 21/068* (2013.01); *B01D 2221/04* (2013.01); *C09K 8/36* (2013.01)

(56) References Cited

U.S. PATENT DOCUMENTS

| | | |
|---|---|---|
| 7,497,954 B2 | 3/2009 | Ivan et al. |
| 8,528,665 B2 | 9/2013 | Jackson et al. |
| 2006/0186056 A1 | 8/2006 | Ivan |
| 2006/0225925 A1* | 10/2006 | Ivan ................ E21B 21/062 175/66 |
| 2008/0029458 A1* | 2/2008 | Fout ................ E21B 21/065 210/702 |
| 2009/0107728 A1 | 4/2009 | Gaddis et al. |
| 2010/0038318 A1 | 2/2010 | Gilmour et al. |
| 2012/0080185 A1 | 4/2012 | Jackson et al. |

FOREIGN PATENT DOCUMENTS

| | | |
|---|---|---|
| GB | 2464890 B | 8/2012 |
| WO | 2006086384 A2 | 8/2006 |

\* cited by examiner mud
treated mud
treatment fluids
base oil
waste

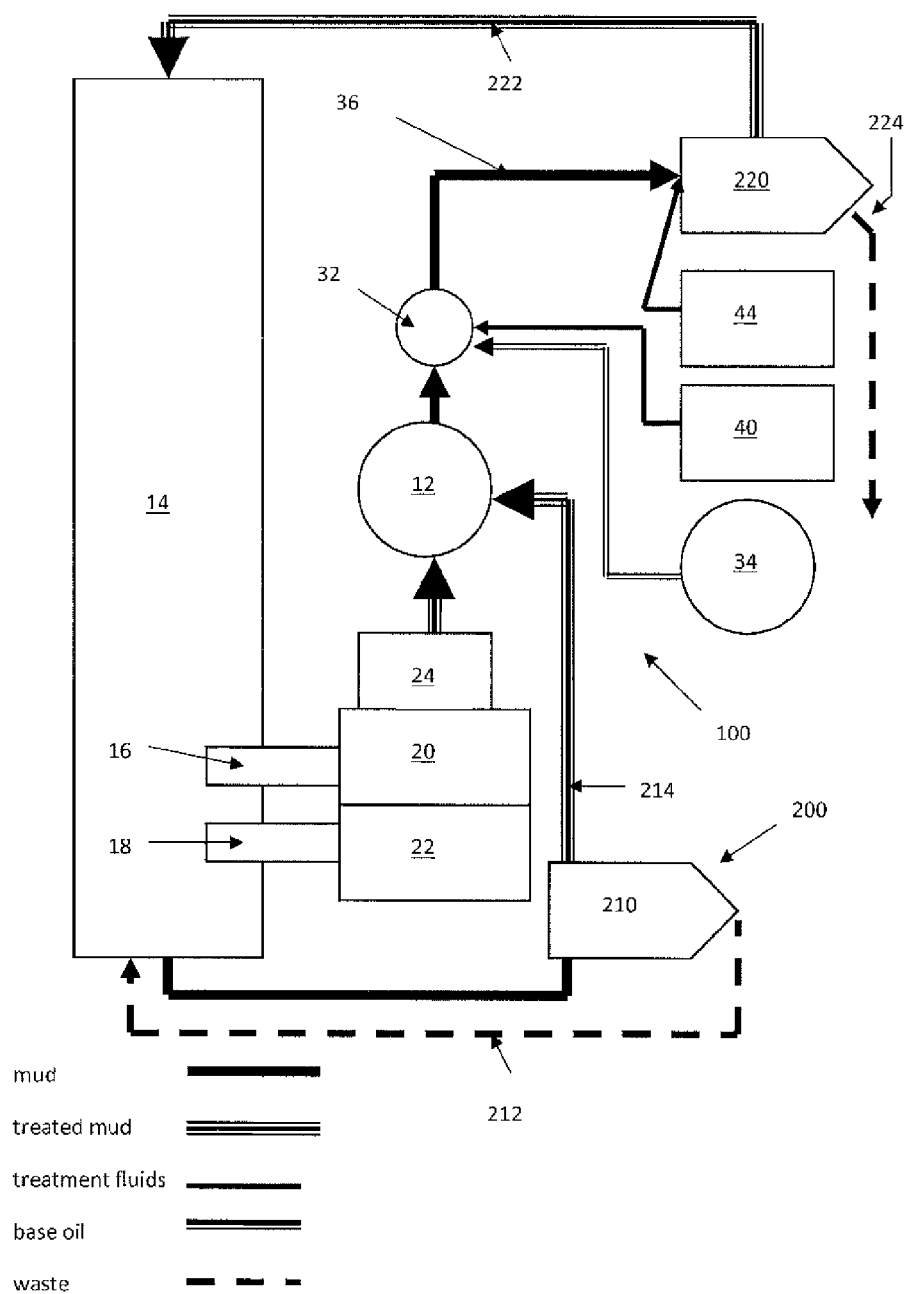

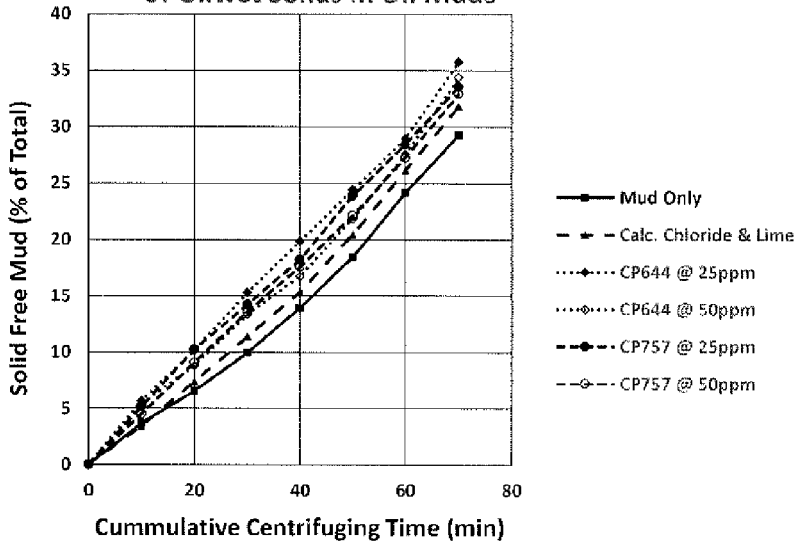
FIG. 3 Effect of Coagulant Type on Stripping Rate of Oilwet Solids in Oil Muds
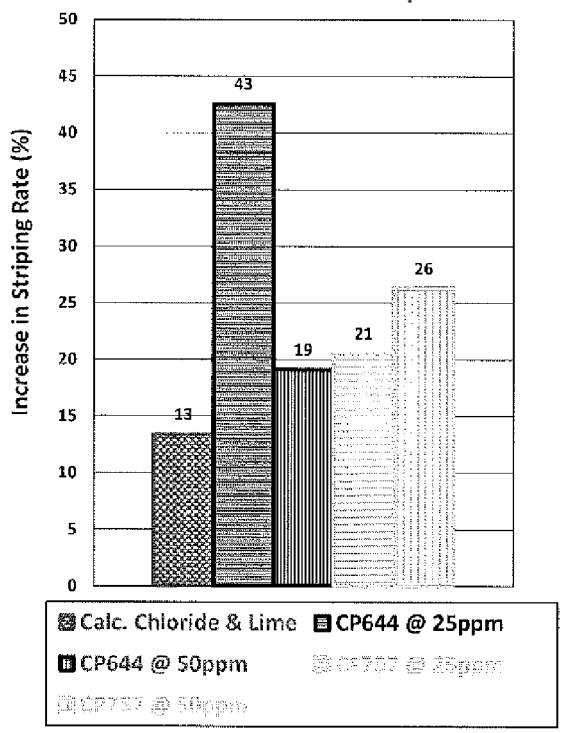
FIG. 4 Effect of Coagulants on 40 minute Average Stripping Rate of Relative to Oil Mud Only

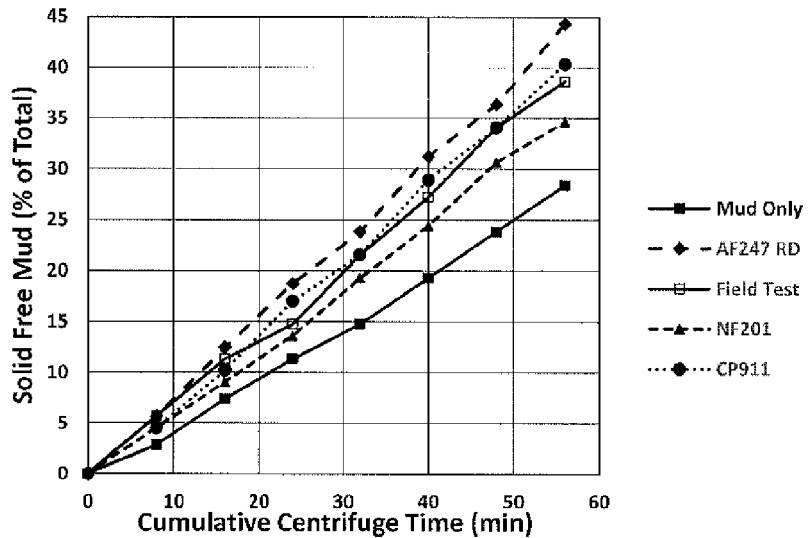
FIG. 5 Effect of Flocculant Type on Stripping Rate of Oilwet Solids in SOBM
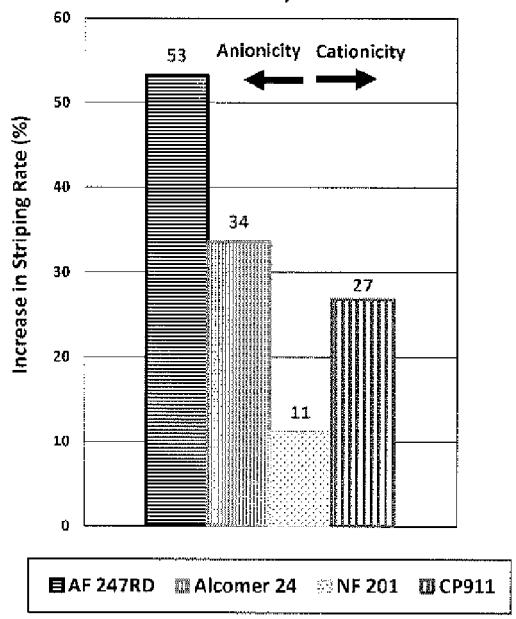
FIG. 6 Effect of Flocculants on Average Stripping Rate of Relative to Oil Mud Only

PROCESS AND APPARATUS FOR TREATING DRILLING FLUID

CROSS-REFERENCE TO RELATED APPLICATIONS

This is a national stage 371 application of International Application No. PCT/CA2014/050116, filed Feb. 20, 2014, designating the United States, incorporated herein in its entirety by reference, which claims the priority of U.S. Provisional Application No. 61/766,865, filed Feb. 20, 2013, and U.S. Provisional Application No. 61/824,186, filed May 16, 2013.

BACKGROUND OF THE INVENTION

1. Field of the Invention

The present invention relates to processes and apparatuses for treating drilling fluids for fossil fuel wells.

2. Brief Description of the Prior Art

During the process of drilling for fossil fuels, the rock formations that are being penetrated by the drilling bit creates drilled cuttings which, to varying degrees and amounts, eventually disintegrate into smaller drilled cuttings, referred to as drilled solids that become an undesirable component of such water phase continuous ("WBM"), or hydrocarbon phase continuous drilling fluids and which convey the drilled cuttings to the surface of the earth and where they are removed, to varying degrees and amounts by one or more types of cuttings and solids removal equipment.

Additionally, in order to contain the fluids within the formations being drilled, it is often necessary to supplement the drilling fluid with weighting agents such as barite, hematite, galena, calcium carbonate, etc., which are similar in size to the drilled solids and for which the specific gravity of said weighting agents is approximately equal to, or greater than the specific gravity of the drilled solids. Because the drilled solids are undesirable and they are small in size, to varying degrees of success, they are commonly removed from the drilling fluid using a decanting centrifuge.

For WBMs, a solids removal process, commonly referred to as "stripping" or "dewatering", or "enhanced centrifuging", is used to enhance the removal of both the water-wet drilled solids and water-wet weighting agents to varying degrees using a decanting centrifuge's principle of solid-liquid separation. However, for an hydrocarbon phase continuous drilling fluid in which the water phase is discontinuous and for which the solid phase is purposely oil wet to maintain such drilling fluid's rheological properties and to prevent such drilling fluid's water phase from becoming the continuous phase (a phenomenon commonly referred to as "flipping"), such a process has not been successfully developed. In some prior processes for removal of solids from hydrocarbon phase continuous drilling fluids employ coagulants and flocculants are used to contact the particulate matter directly without being dissolved a priori. In other prior art processes from the removal of solids from hydrocarbon phase continuous drilling fluids the wettability of the particulate matter is altered from being oil wet to being water wet before the particulate is contacted by any coagulants or flocculants. However, there is a continuing need for a process for the efficient removal of solids from hydrocarbon phase continuous drilling fluids.

SUMMARY OF THE INVENTION

The process of the present invention provides a method of treating hydrocarbon phase continuous drilling fluids.

The present invention proves a process for treating fossil fuel well drilling fluids. The process includes providing an input drilling fluid having a continuous hydrocarbon phase, a discontinuous aqueous phase, and a discontinuous solid phase, the drilling fluid having an oil-to-water weight ratio. The process further includes providing at least one polymer solution, and providing at least one coagulant. The process also includes providing added water. The process also includes providing oil, the oil and water being provided in a volume ratio being from 0.7 to 1.3 times the oil-to-water volume ratio of the drilling fluid. The process also includes mixing the drilling fluid, the at least one coagulant, the at least one polymer solution, the oil, and the water in any order to provide an input fluid. The process also includes providing the input fluid to a decanting centrifuge. The process also includes centrifuging the input fluid to separate solid materials from the input fluid to provide a treated drilling fluid. Any two or more of the drilling fluid, the water, the coagulant, the flocculant and the oil (i.e. the components) can be mixed with any one or more of the other component prior to being provided to the centrifuge, or any two or more of the of components can be mixed with any one or more of the components in the centrifuge itself. In one presently preferred embodiments of the present invention, the added water is being provided by water included in either the at least one polymer solution, the at least one coagulant, or both. Preferably, the at least one polymer solution comprises a polymeric flocculant dissolved in an aqueous medium. Preferably, the coagulant is dissolved or suspended in an aqueous medium. Preferably, the discontinuous solid phase comprises oil-wet particulate. In one presently preferred embodiment, the process further comprises providing the treated drilling fluid to an active drilling system. In one presently preferred embodiment, the process further comprises discharging an oil-wet particulate from the centrifuge. Preferably, the wettability of the oil-wet particulate discharged from the centrifuge is substantially the same as the oil-wet particulate of the input drilling fluid. In one presently preferred embodiment, the process is carried out continuously. In another presently preferred embodiment, the process is carried out in a batch mode. In a presently preferred embodiment, wherein the drilling fluid is provided to the centrifuge at a rate from about 250 to about 400 liters per minute. In this embodiment, preferably the aqueous medium including the polymeric coagulant is injected into the centrifuge at a rate of from 0 to about 5 lpm. In this embodiment, preferably the aqueous medium including the polymeric flocculant is injected into the centrifuge at a rate of from 0 to about 5 lpm. In a presently preferred embodiment, the flocculant is selected from the group consisting of polyacrylamides, copolymers of acrylamide and sodium acrylate, and dimethylaminoethyl acrylate methyl chloride. In a presently preferred embodiment, the coagulant is selected from the group consisting of hydrated lime, calcium chloride, and mixtures thereof. In one presently preferred embodiment, the coagulant is selected from the group consisting of aqueous solutions, dispersions, or emulsions of polydiallyldimethylammonium chlorides and polyquaternary amines.

The present invention also provides apparatus for treating drilling fluids which are used in the process of drilling for fossil fuels. The apparatus includes a feed pump for receiving drilling fluid to be treated, and a centrifuge, the feed pump being operatively connected to the centrifuge through a feed line. The apparatus also includes a tank for storing base oil, the tank for storing base being operatively connected to the feed pump, feed line, or centrifuge for delivering base oil to the centrifuge. The apparatus also includes a tank for storing coagulant, the tank for storing coagulant being operatively connected to the feed pump, feed line, or centrifuge for delivering coagulant to the centrifuge. The apparatus also includes a tank for storing flocculant, the tank for storing flocculant being operatively connected to the feed pump, feed line, or centrifuge for delivering flocculant to the centrifuge. Optionally, the flocculant tank and coagulant tank can comprise a single tank for containing a mixture of flocculant and coagulant when the two are compatible.

In one presently preferred embodiment, the centrifuge is operatively connected to the mud tank of an active drilling system for delivering treated drilling fluid to the mud tank. In one presently preferred embodiment, the apparatus further comprises a holding tank operatively connect to the feed pump for delivering drilling fluid to be treated thought the feed pump to the centrifuge. In another presently preferred embodiment, the apparatus further comprises a recovery centrifuge operatively connected to the holding tank for delivering drilling fluid to be treated to the holding tank, the recovery centrifuge being operatively connected to the mud tank of an active drilling system for receiving untreated drilling fluid, and for returning discharged solids to the mud tank.

BRIEF DESCRIPTION OF THE DRAWINGS

FIG. 2 is a schematic illustration of an apparatus for carrying out the process of the present invention, suitable for processing weighted oil mud.

FIG. 3 is a chart illustrating the effect of coagulant type on the stripping rate of oil-wet solid in oil muds.

FIG. 4 is a chart illustrating the effect of coagulant on the 40 minute average stripping rate of oil-wet solids relative to oil mud only.

FIG. 5 is a chart illustrating the effect of flocculant type on the stripping rate of oil-wet solids.

FIG. 6 is a chart illustrating the effect of flocculants on the average stripping rate of oil-wet solids relative to oil mud only.

DETAILED DESCRIPTION

Figure 1:
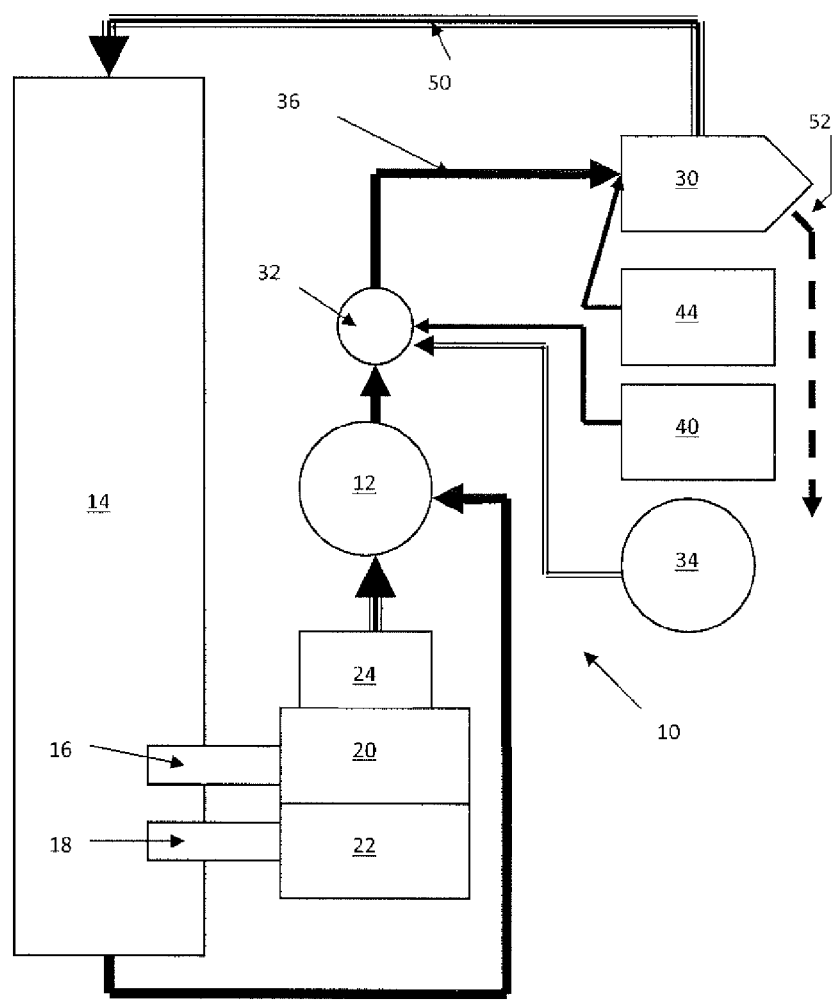
FIG. 1 is a schematic illustration of an apparatus for carrying out the process of the present invention, suitable for processing unweighted or lightly weighted oil mud.

Advantageously, the process of the present invention provides effective treatment of hydrocarbon phase continuous drilling fluids without "flipping" to a significant degree or at all. Further, the process of the present invention provides effective treatment of hydrocarbon phase continuous drilling fluids without significantly altering or changing either the rheological or chemical properties of an hydrocarbon phase continuous drilling fluid. Further the process of the present invention provides effective treatment of hydrocarbon phase continuous drilling fluids without changing or significantly altering the wettability of its partially or wholly oil wet solid phase. The process of the present invention provides such effective treatment of hydrocarbon phase continuous drilling fluids by removing the solid phase of a hydrocarbon continuous phase drilling fluid, in whole or in part. The process of the present invention also provides for preferential removal of components of the solid phase of the hydrocarbon phase continuous drilling fluid.

Hydrocarbon phase continuous drilling fluids are commonly referred to as "invert emulsion muds," "inverts," "OBMs," "SBMs" or "SOBMs. Hydrocarbon phase continuous drilling fluids are collectively referred to herein as "oil muds." Oil muds include a liquid portion which is comprised of a continuous hydrocarbon phase, e.g., diesel fuel, bio-diesels, distillates, mineral oils, low toxicity mineral oils, synthetic base oils, etc. To varying degrees oil muds also include a discontinuous aqueous phase, such as saline solution, commonly a calcium chloride solution, or another inorganic or organic salt solution in which the salt is dissolved to reduce the water's activity (vapour pressure). The discontinuous aqueous phase is emulsified within the continuous hydrocarbon phase to become a discontinuous part of the oil mud. Oil muds also include a partially or wholly oil-wet particulate solids phase. The particulate solids phase comprises from approximately one to 60 volume percent of the oil mud. The particulate solids phase is comprised of, in whole or in part (i) undesirable, naturally or artificially oil-wet drilled solids to varying degrees and amounts, (ii) undesirable, dispersed organic matter in varying amounts, (iii) weighting agents in varying amounts, (iv) organophyllic clay and various other necessary solid, powder-like or granular materials in varying amounts.

As it pertain in particular to the separation of particulate matter from oil muds, unlike prior processes in which coagulants and flocculants either contact the particulate matter directly without being dissolved a priori, or the wettability of the particulate matter is altered from being oil wet to being water wet before the particulate is contacted by any coagulants or flocculants, in the process of the present invention coagulants and/or flocculants are pre-dissolved in water, and the wettability of the particulate matter being treated is not intentionally altered before either the coagulants or the flocculants contact the particulate matter.

In the present process, oil mud is taken from a storage device (such as a "mud tank") by a feed pump, and provided to a decanting centrifuge. A specifically prepared coagulant and flocculant polymer solution (hereinafter "the solextracting blend"), is mixed in water and, together with the addition of base oil at a rate that will maintain the oil water ratio, O/W, of the oil mud, these three liquid streams are introduced and combined, separately or together, with the oil mud, at any point(s) enroute to the inflow of the decanting centrifuge. Then, without intentionally altering the wettability of the already oil wet particulate (the drilled solids) in the oil mud, such particulate is then separated, to varying degrees, from the liquid phase by the centrifuge.

The present process can be employed in conjunction with existing solids removal equipment and methodology. Alternatively, the process of the present invention can be implemented using a unique treatment module comprising various processing equipment. The process of the present invention can be carried out in a continuous manner. The process of the present invention can also be carried out as a batch process.

As used herein the term "continuous processing" means any process which removes, in whole or in part, the solids phase of an oil mud using a decanting centrifuge while drilling is proceeding.

For un-weighted or lightly weighted oil mud drilling operations oil mud is typically taken directly from the active drilling system and is passed directly to a decanting centrifuge. Occasionally; more so in the past, oil mud is transferred to a holding tank which takes the mud from the active system and the concentrate (underflow) from any other solids removal equipment such as a de-sander or de-silter. The process of the present invention can be employed to treat un-weighted or lightly weighted oil mud.

A treatment module or apparatus 10 for carrying out these operations is shown schematically in FIG. 1. Like reference numerals indicate like elements throughout the drawings. The treatment module 10 can include:

A holding tank 12 for supplying drilling mud for treatment. The drilling mud is drawn from the mud tank 14 from which drilling mud is drawn for drilling operations. The mud provided from the mud tank 14 can optionally be initially treated by one or more shale shakers 16, 18, and dried by one or more dryers 20, 22, and stored in a dryer tank 24, before being provided to the holding tank 12.

Preferably, a decanting centrifuge 30 that can accurately regulate the feed rate, the bowl speed and the back drive speed (relative rpm)

A pump 32 to feed base oil from a base oil holding tank 34 into a feed line 36 to the centrifuge 30 preferably at some upstream point (typically at the feed pump 32 to the centrifuge as shown in FIG. 1). The injection rate of the base oil is such that the oil to water ratio of the oil mud is not altered A coagulant mixing tank 40 from which coagulant is injected at a prescribed rate into the feed line 36 to the centrifuge 30 preferably at an upstream point (typically at the feed pump 32 to the centrifuge 30). It is preferable for the coagulant mixing tank 40 to have an adequate mixing capability and an injection pump (not shown) that can precisely regulate the solution's injection rate.

A flocculant mixing tank 44 from which flocculant is injected at a prescribed rate into the feed line 36 to the centrifuge 30 preferably at some point downstream from where the coagulant and the base oil are injected. A preferable injection point for the flocculant is directly into the centrifuge's feed tube. It is preferable for the flocculant mixing tank 44 to have an adequate mixing capability and an injection pump that can precisely regulate the solution's injection rate.

A mud mixing unit (not shown), typically the drilling rig's mixing hopper (not shown) that re-adjusts the salinity, the excess lime content, the emulsifier content and any other additives deemed necessary after the oil mud has passed through the centrifuge and recirculated in the mud tank 30.

The rate at which coagulant and flocculant are injected into the centrifuge 30 is dependent upon the total solids content of the oil mud, the size, type and concentration of solids in the oil mud, the rate at which solids are being generated by the drilling operation, the degree to which the solids content in the oil mud is to reduced and the feed rate capability of the centrifuge.

The centrifuge 30 is operated to provide a treated mud stream 50 (the "centrate") which is returned to the mud tank 14 and a waste particulate stream 52 (the "concentrate").

For operations with weighted oil muds, a treatment module 100 for carrying out these operations is shown schematically in FIG. 2. The apparatus 100 includes a weighting agent recovery system 200, including a weighting agent recovery centrifuge 210, typically referred to as a "Barite recovery centrifuge." In this case, the concentrate (underflow) 212 from the recovery centrifuge 210 is remixed into the oil mud and the centrate (overflow) 214 therefrom is pumped into the holding tank 12 to which oil mud from any oil recovery equipment (e.g., dryers and shakers) and occasionally oil mud from the active mud system is also added from time to time. The oil mud from the holding tank 12 is then pumped to a "polishing" centrifuge 220 from which the centrate 222 is returned to the active mud system 10 for treatment and recirculation; the concentrate 224 is discarded.

For these operations the treatment module 100 is otherwise the same as the module 10 used for unweighted oil muds and the base oil, the coagulant and the flocculant are preferably injected into the feed line of the polishing centrifuge 220.

As used herein the term "batch processing" is understood to mean any process which removes, in whole or in part, the solids phase of an oil mud using a decanting centrifuge. Batch processing includes the onsite separation of drilled solids from an oil mud between successive wells after a well has been drilled.

For onsite separation, if the mud tank system, or a portion thereof, cannot be used to recirculate the oil mud after it has passed through the centrifuge' some form of open tank such as a premix tank can be incorporated.

Batch processing also includes the separation of drilled solids from an oil mud after the oil mud has been transported elsewhere to any holding or treatment facility such as a "mud plant."

For batch processing the same module as the module used for unweighted oil muds can be employed to carry out the process of the present invention. If the oil mud has been transported to a treatment or holding facility a treatment tank can replace the mud tank or a premix tank that would otherwise be used to re-circulate the oil mud after it has passed through the centrifuge.

The process of the present invention can remove or enhance the removal of partially or wholly oil-wet solids from an oil mud.

Preferably, in the process of the present invention the oil mud to be processed is fed to the centrifuge at a rate of from about 250 to about 400 lpm ("liters per minute). Preferably, the coagulant solution is preferably injected at a rate of from 0 to about 5 lpm. Preferably, the polymer solution is injected at a rate of from about 1 to about 5 lpm.

Unless otherwise stated, the term "molecular weight" as used herein when referring to a polymeric material means the weight average molecular weight.

The coagulant employed in the process of the present invention can be an aqueous medium such as water in which one or more organic or inorganic coagulant materials is dissolved or dispersed ("coagulant solution"), and can be comprised of any one, or any combination of the following:

Inorganic coagulants including:

An aqueous solution of from about 1 to about 40 weight percent calcium chloride.

An aqueous solution of from about 0.5 to about 20 g/L hydrated lime

An aqueous solution of from about 1 to about 500 mg/L of any other inorganic compound effective as a coagulant, including, for example, aluminum chloride, polyaluminum chloride, polyaluminum chloride-chlorohydrate, aluminum sulfate, polyaluminum sulfate, polyaluminum silica sulfate or other aluminum based coagulants, ferrous chloride, ferrous sulfate, ferric chloride, ferric sulfate, acidified ferric sulfate, polyferric sulfate, ferric ferrous chloride, ferric ferrous sulfate, iron oxide or other iron based coagulants Any other inorganic or organic salt, at a concentration which is approximately equal to the concentration of such chemical compound in the water phase of the oil mud that is being treated Cationic organic coagulants include:

Aqueous solutions of homopolymers of poly(diallyldimethylammonium chloride) ("poly(DADMAC)") having molecular weight in the range of from about 100,000 to about 600,000 g/mole; preferably as a 10-50% concentrate.

Aqueous solutions of homopolymers of poly(tetramethylarnmonium chloride) ("poly(TMAC)") having molecular weight in the range of from about 100,000 to about 600,000 g/mole; preferably as a 10-50% concentrate.

Aqueous solutions of homopolymers of polyquaternary amine compounds ("Quats") having a molecular weight in the range of from about 10,000 to about 100,000 g/mole; preferably as a 10-50% concentrate.

Aqueous solutions of homopolymers of poly(epichlorhydrin-dimethylamine) ("poly(EPI-DMA)") having a molecular weight in the range of from about 1,000 to about 100,000 g/mole; preferably as a 10-50% concentrate.

Aqueous solutions of homopolymers of poly(ethylene oxide) having a molecular weight in the range of from about 100,000 to about 600,000 g/mole; preferably as a 10-50% concentrate.

Aqueous solutions of homopolymers of glyoxylated polyacrylamide, ("poly(PAM glyoxal)") having a molecular weight in the range of from about 100,000 to about 600,000 g/mole; preferably as a 10-50% concentrate.

Aqueous solutions of homopolymers of cationic starch having a molecular weight in the range of from about 200,000 to about 1,000,000 g/mole Aqueous solutions of homopolymers of polyvinylamine resin ("poly(PAm-resin)") having a molecular weight in the range of from about 100,000 to about 600,000 g/mole; preferably as a 10-50% concentrate Zwitterionic organic coagulants including:

Aqueous solutions of zwitterionic copolymers of anionic polyacrylic acid ("PAA") and cationic polydiallyldimethylammoniumchloride ("poly(DADMAC)") having a charge density ratio range from about 5% C (i.e five percent cationic): 30% A (i.e. 30 percent anionic) to about 50% C: 10% A, and a molecular weight in the range of from about 100,000-1,000,000 g/mole; preferably as a 10-50% concentrate Aqueous solutions of zwitterionic terpolymers of non-ionic acrylamide, PAA and cationic poly(DADMAC) having charge density ratio range of from about 5% C:30% A to about 50% C:10% A, and a molecular weight in the range of from about 300,000 to about 1,000,000 g/mole; preferably as a 10-50% concentrate.

Flocculants that can be employed in the process of the present invention include polymeric flocculants dispersed or dissolved in an aqueous medium such as water ("flocculant solution"). Examples of flocculants that can be employed in the process of the present invention include any one, or a combination of the following:

Nonionic flocculants including:

Aqueous solutions of homopolymers of acrylamide ("PAM") having a charge density of from about 0-1%, and a molecular weight; molecular weight in the range of about 5,000,000-20,000,000 g/mole Anionic flocculants including:

Aqueous solutions of homopolymers of non-ionic acrylamide copolymerized with any of the following homopolymers, or mixtures thereof, having an anionic charge density preferably in the range of from about 10 to about 40%, and which have molecular weights ranging from about 1,000,000 to about 10,000,000 g/mole:

Aqueous solutions of homopolymers of acrylamide.

Aqueous solutions of homopolymers of acrylamide combined with acrylic acid and/or its salts.

Aqueous solutions of copolymers of acrylamide and polyacrylic acid and/or its salts.

Aqueous solutions of homopolymers of acrylamide combined with an anionic salt of hydroxamic acid Aqueous solutions of copolymers of acrylamide and salts of hydroxamic acid.

Aqueous solutions of homopolymers of acrylamide combined with methacrylic acid.

Aqueous solutions of copolymers of acrylamide and methacrylic acid and/or its salts.

Aqueous solutions of homopolymers of acrylamide combined with 2-acrylamido-2-methylpropane sulphonic acid and/or salts thereof.

Aqueous solutions of copolymers of acrylamide and 2-acrylamido-2-methylpropane sulphonic acid and/or its salts.

Aqueous solutions of homopolymers of acrylamide which are the hydrolysable equivalents of the acrylamide-containing copolymers listed above.

Aqueous solutions of copolymers of methacrylic acid and acrylic or methacrylic acid esters having a charge density preferably in the range of from about 10-40%, and a molecular weight preferably ranging from about 3,000,000 to about 8,000,000 g/mole.

Aqueous solutions of homopolymers of methacrylic acid and homopolymers of acrylic or methacrylic acid esters having a charge density preferably in the range of from about 10 to about 40%, and a molecular weight preferably ranging from about 3,000,000 to about 8,000,000 g/mole.

Cationic flocculants including:

Aqueous solutions of acrylamide copolymerized with any of the following cationic monomers (or mixtures thereof), or mixtures of acrylamide homopolymers combined with any of the following cationic monomers, and having a cationic charge density preferably in the range of from about 20 to about 90% and which have molecular weights ranging from 3,000,000-10,000,000 g/mole:

Dimethylaminoethyl acrylate methyl chloride ("DMAEA-MeCl").

Dimethylaminoethyl acrylate dimethyl sulfate, ("DMAEA-DMeSO$_4$").

Dimethylaminoethyl methacrylate methyl chloride ("DMAEMA-MeCl").

Dimethylaminoethyl methacrylate dimethyl sulfate, ("DMAEMA-DMeSO$_4$").

Polydiallyldimethylammonium chloride ("poly (DADMAC)").

Poly(trimethylammonium ethyl acrylate chloride, ("poly [TMAEAC]").

Aqueous solutions of acrylamide copolymerized with any of the following cationic monomers (or mixtures thereof), or mixtures of acrylamide homopolymers combined with any of the following cationic monomers, and having a cationic charge density preferably in the range of from about 30 to about 90%, and which have molecular weights ranging from about 3,000,000 to about 10,000,000 g/mole:

Dimethylaminoethyl acrylate methyl chloride ("DMAEA-MeCl").

Dimethylaminoethyl acrylate dimethyl sulfate, ("DMAEA-DMeSO$_4$").

Dimethylaminoethyl methacrylate methyl chloride ("DMAEMA-MeCl").

Dimethylaminoethyl methacrylate dimethyl sulfate, ("DMAEMA-DMeSO$_4$").

Polydiallyldimethylammonium chloride ("poly (DADMAC)").

Poly(trimethylammonium ethyl acrylate chloride) ("poly [TMAEAC]").

Aqueous solutions of homopolymers of poly(trimethylammonium ethyl methylacrylate chloride) ("poly[TMAE-MAC]"), having a charge density of from about 80 to about 100%. and a molecular weight in the range of from about 2,000,000 to about 10,000,000 g/mole; preferably as a 10-50% concentrate.

Aqueous solutions of homopolymers of diethylaminopropyl methacrylamide ("poly(DMAPMA)"), having a molecular weight in the range of from about 2,000,000 to about 10,000,000 g/mole.

Aqueous solutions of homopolymers of acrylamidopropyl trimethylammonium chloride ("poly(MAPTAC)"), having a molecular weight in the range of about from about 2,000,000 to about 10,000,000 g/mole.

Aqueous solutions of homopolymers of cationic starch having a molecular weight in the range of from about 2,000,000 to about 10,000,000 g/mole.

Aqueous solutions of homopolymers of cationic chitin ("chitosan"), having a molecular weight in the range of about from about 2,000,000-10,000,000 g/mole.

Aqueous solutions of copolymers of cationic starch and chitosan having a molecular weight in the range of from about 2,000,000 to about 10,000,000 g/mole.

Aqueous solutions of homopolymers of cationic starch combined with homopolymers of chitosan, and having a molecular weight in the range of from about 2,000,000 to about 10,000,000 g/mole.

Zwitterionic flocculants including:

Aqueous solutions of terpolymers of non-ionic acrylamide, anionic polyacrylic acid ("PAA"), and cationic polydiallyldimethylammonium chloride ("poly(DADMAC)"), having a charge density ratio range of from about 5% C:30% A to about 50% C:10% A, and a molecular weight in the range of about 3,000,000-10,000,000 g/mole; preferably as a 10-50% concentrate.

Aqueous solutions of non-ionic homopolymers of acrylamide combined with an anionic homopolymer of polyacrylic acid ("PAA") and a cationic homopolymer of polydiallyldimethylammonium chloride ("poly(DADMAC)"), and having a charge density ratio range of from about 5% C:30% A to about 50% C:10% A, and a molecular weight in the range of from about 3,000,000 to about 10,000,000 g/mole; preferably as a 10-50% concentrate Aqueous solutions of homopolymers of anionic acrylamide and cationic copolymer of vinyl acetate and diallyldimethyl ammonium chloride having a charge density ratio range from about 5% C:30% A to about 50% C:10% A, and a molecular weight in the range of about 3,000,000-10,000,000 g/mole, preferably as a 10-50% concentrate.

Depending on the degree of solids cleaning desired, the feed rate ratio the total oil mud in relation to any of the coagulant solutions and/or flocculant polymer solutions can will vary from about 10:1 to 100:1

While these specific non-ionic, anionic, cationic and zwitterionic polyelectrolytes, as specified above, have been employed in carrying out the process according to this invention, it will be appreciated that other non-ionic, anionic, cationic, and zwitterionic polyelectrolytes can also be employed in the process of the present invention.

During the process of the present invention the continuous oil phase is maintained.

The process of the present invention can be carried out either as a batch process or a continuous process. Further, the process of the present invention can include a preconditioning step in which influx to suitable preconditioning unit is treated and the effluz from the preconditioning unit is input to the continuous or batch module described above for further processing. In addition, the process of the present invention can include a post-conditioning step in which drilling mud treated by either the continuous or batch module described above is further treated by suitable post-conditioning treatment.

The continuous process according to the present invention does not significantly most of the properties of the oil mud are not altered significantly. Only the solids phase is reduced.

For weighted oil muds the pre-conditioning unit may, in part, as a sub-unit, consist of the primary barite recovery centrifuge common to the Barite recovery process.

For any weighting agent recovery process, the process of the present invention can be applied to 'polishing centrifuge' to improve the quality of the centrate (overflow) being returned to the active mud system.

Notwithstanding other shale oil or shale gas reserves or deposits ("plays") existing elsewhere, the process applies particularly to shale oil or shale gas drilling operations such as the Marcellus, Barnett, Eagle Ford, Haynesville, and Bakken plays in the US and the Duvernay, Montney, Muskwa, Horn River Basin and Liard basin plays in Canada.

The process of the present invention can be applied to any drilling operation using oil mud or any WBM which contains significant proportions of oil in its liquid phase and whose solid phase contains some wholly or partially oil-wet solids.

The process of the present invention can be applied to bituminous sand drilling (for example SAGD drilling operations) to reduce the fraction of bitumen that is attached to the drilled cuttings or drilled solids created in the SAGD drilling process or for the purpose of maintain the mud systems being used.

The process of the present invention can also be applied to fracturing fluids, industrial waste water treatment, sludge dewatering or any other process which may contain, in whole are in part, undissolved solids fractions which are similar to those found in oil muds.

The process of the present invention can significantly reduce drilling operational costs.

The process of the present invention can significantly reduce the environmental footprint associated with refurbishing oil muds The process of the present invention can significantly reduce the environmental footprint associated with disposal of oil contaminated drilling wastes

EXAMPLES

The process of the present invention was applied in a field trial on the Rhodes pad of the Marcellus play in Lycoming County, Pennsylvania. The specific process application conditions and parameters are provided in Table 1.

TABLE 1

| | | |
|---|---|---|
| Original Oil Mud | | 500 bbl of 100 s/qt Funnel Viscosity, 13.5 ppg, 80/20 O/W SOBM, 18% Barite, 6% LGS and 12% organic LGS containing. This SOBM, which was serviced and provided by Anchor Drilling Fluids, USA, had been previously used on several wells in which dilution with clean base fluid was used to reduce the LGS between wells. |
| Centrifuge: | NOV Brandt HS 2172 | Bowl Speed: 2550 rpm Relative Speed: 40 rpm Flow Rate: 100 gpm (380 lpm) |

TABLE 1-continued

| | | |
|---|---|---|
| Coagulants Added: | | 2.8 wt % calcium chloride and 0.6 g/L hydrated lime |
| | Feed rate | 1.41 gpm (5.37 lpm) |
| | Mud:Coagulant Ratio: | 77:1 |
| Flocculant Added | | 4.45 ppb (12.7 g/L) Alcomer 24 |
| | Feed rate | 1.13 gpm (4.29 lpm) |
| | Mud:Coagulant Ratio | 88:1 |
| Base Oil Added: | | 10.2 gpm (38.9 lpm), initially to maintain O/W and lower viscosity. However, additions stopped when the tanks became full (to 600 bbl) |
| Final Solids Content: | | 1.5% LGS of s.g = 2.6 and 3% organic LGS of s.g. = 1.0 after 18.3 hours |

In the absence of coagulant and flocculant additions, based on their experience, both the solids control company and the mud company originally estimated it would take least 48 hours to achieve similar results.

To investigate the use of other coagulants and flocculants useful in the process of the present invention, and to compare their effectiveness to the blend used in the Lycoming County, PA, field application, laboratory test were conducted at the laboratory of Praktikum Solutions Inc., Calgary, AB, Canada.

To minimize the effects that an oil mud's water content may contribute to the effectiveness flocculants the water content of the Oil Mud was reduced from 20% to 10%. For these tests Bri-Chem Supply, Calgary, AB, Canada, supplied the oil mud products.

For LGS drilled solids 10% organic rich Marcellus Shale core was obtained from a well drilled in Bald Eagle State Park, Centre County, PA, courtesy of the Geology Department of Pennsylvania's Bureau of Topographic & Geologic Survey. The core was broken up and then dry ground with a blender to generate the fines for use as LGS. Using Canadian Standard screens the fines were then dry sieved on 100 (150 μm) and 200 mesh (75 μm) screens and only those fines less than 75 μm were used as drilled solids in the Oil Mud formulation. A 10 gm sample of these drilled solids was then carefully wet screened over a 325 mesh screen to determine the LGS solids fraction less than 44 μm was. A pyncnometer density was also determined for the LGS.

Marcellus Shale was chosen as the LGS for the laboratory investigation for the following reasons:

It is representative of the same LGS that were present in the field application of field trial of the process of the present invention in Lycoming County, PA.

Marcellus Shale contains 10% organic matter (pyrobitumen) which has an s.g. of only 1.0 compared to 2.6-2.7 for typical drilled solids.

Because it is insoluble in oil it will remain the solids phase of the oil mud, break down and eventually disperse and thereby make it more difficult to remove using the conventional solids control methods common to the oil industry.

Knowing the success of the field application (for which the coagulant was 3 wt % calcium chloride combined with 0.6 g/L hydrated lime and the flocculant used was Alcomer 24), the merits of other coagulants and flocculants can be compared to field application to optimize the process of the present invention and predict how much more successful the process of the present invention can be than it already was in the field. The oil mud formulations employed in laboratory testing are provided in Table 2. The physical properties of the oil mud at 20 degrees C. are provided in Table 3. The physical properties of the Marcellus shale drilled solids are provided in Table 4. Suppliers of coagulants and flocculants were solicited to obtain the selection of products used in the tests. The suppliers of the coagulants and flocculants are provided in Table 5.

TABLE 2

| | Concentration | |
|---|---|---|
| Product | API Units | SI Units |
| Base oil | 0.873 bbl/bbl | 801 L/m$^3$ |
| Emulsifier | 3.5 lb$_m$/bbl | 11.0 L/m$^3$ |
| Wetting agent | 2.9 lb$_m$/bbl | 9.2 L/m$^3$ |
| Rheology Modifier | 1.5 lb$_m$/bbl | 4.6 L/m$^3$ |
| Total Oil | 0.90 bbl/bbl | 826 L/m$^3$ |
| 25 wt % calcium chloride | 0.10 bbl/bbl | 92 L/m$^3$ |
| Organophyllic clay | 3.0 lb$_m$/bbl | 7.9 kg/m$^3$ |
| LGS drilled solids | 98 lb$_m$/bbl | 281 kg/m$^3$ |

TABLE 3

| | API Units | SI Units |
|---|---|---|
| Plastic Viscosity | 54 cps | 54 mPa · s |
| Yield Point | 36 lb$_f$/100 ft$^2$ | 17.2 Pa |
| Initial Gel Strength | 4.5 lb$_f$/100 ft$^2$ | 2.2 Pa |
| Ten Minute Gel Strength | 10 lb$_f$/100 ft$^2$ | 4.8 Pa |
| Herschel-Bulkley constants[a] | | |
| Yield Stress (T$_0$) | 2.64 lb$_f$/100 ft$^2$ | 1.26 Pa |
| Consistency (K) | 0.19 lb$_f$/100 ft$^2$ · s$^n$ | 0.092 Pa · s$^n$ |
| Flow Index (n) | 0.877 | 0.877 |
| Density | 9.1 ppg | 1090 kg/m$^3$ |
| O/W | 90/10 | 90/10 |

[a]The Herschel-Bulkely constants were established from 8-speed data using an Ofite Model 900 rheometer

TABLE 4

| | |
|---|---|
| Average bulk s.g. | 2.42 |
| Organics s.g. | 1.0 |
| Organic content | 10% |
| Drilled solids particle size | |
| % less than 75 μm | 100 |
| % less than 44 μm | 87 |

TABLE 5

Di-Corp, Calgary, Alberta, Canada
Hichem Inc. (Canada), Calgary, Alberta, Canada
BASF (Canada), Calgary, Alberta, Canada All coagulants and flocculants were prepared at their respective concentrations in distilled water by mixing them at the lowest speed for 10 minutes on a 12-speed Oster blender. For all the flocculant solutions, the pH was adjusted a priori to 8.0 using 8N KOH. The coagulants and flocculants used for the tests are listed in Table 6 below.

TABLE 6

| Coagulants and Flocculants | Supplier | Product Brand Name | Concentration and Ratio of Oil Mud:Additive | MW | Charge Density (%) |
|---|---|---|---|---|---|
| Coagulants Inorganic*** | | | | | |
| Hydrated Lime | Di-Corp | N/A | 0.75 g/L Lime | N/A | N/A |
| Calcium Chloride | Di-Corp | N/A | plus 3 wt % $CaCl_2$ @ 20:1 | N/A | N/A |
| Organic | | | | | |
| Poly(DADMAC) - as 40 wt % emulsion | Hichem Inc. | Hyperdrill CP 644 | 25 ppm @ 20:1 | 200,000 | 100 |
| Poly(DADMAC) - as 40 wt % emulsion | Hichem Inc. | Hyperdrill CP 644 | 50 ppm @ 20:1 | 200,000 | 100 |
| Polyquaternary amine (Quat) - as 50 wt % emulsion | Hichem Inc. | Hyperdrill CP 757 | 25 ppm @ 20:1 | 80,000 | 100 |
| Polyquaternary amine (Quat) - as 50 wt % emulsion | Hichem Inc. | Hyperdrill CP 757 | 50 ppm @ 20:1 | 80,000 | 100 |
| Flocculants** Nonionic | | | | | |
| Polyacrylamide (PAM) | Hichem Inc. | Hyperdrill NF 201 | 6 g/L @ 20:1 | 10,000,000 | 0.5 |
| Anionic | | | | | |
| PAM/Na-polyacrylate copolymer | BASF | Alcomer 24* | 6 g/L @ 20:1 | low/med. | low |
| PAM/Na-polyacrylate copolymer | Hichem Inc. | Hyperdrill AF 247RD | 6 g/L @ 20:1 | 5,000,000 | 30 |
| Cationic | | | | | |
| DMAEA-MECL | Hichem Inc. | Hyperdrill CP911 | 6 g/L @ 20:1 | 6,000,000 | 70 |

*Alcomer 24 was used for the first field application of the process of the present invention. MW and charge density not disclosed beyond the description in the Technical Data Sheet provided
**All flocculants were tested in conjunction with a coagulant solution consisting of 3 wt % calcium chloride together with 0.75 g/L hydrated lime which was premixed into the oil mud before the flocculants were added
***The calcium chloride and hydrated lime were combined to make one coagulant solution that was added in 1:20 ratio with the oil mud.

For all the tests, when the coagulant and flocculant solutions were mixed with the oil mud these solutions were mixed in exactly the same manner, these solutions were all mixed for the same amount of time and these solutions were all mixed together with 200 mL of oil mud in the same 1:20 ratio. For both the coagulant and flocculant solutions, when they were first added to the oil mud they were mixed for 5 minutes at 275 rpm on a Phipps & Bird, Model PB-950 Jar Tester to ensure they were well blended with the oil mud. Then, because these solutions were quite viscous and they contained 12 vol % Marcellus Shale drilled solids, the mixtures were all stirred at 50 rpm for 20 more minutes to allow the flocs to form and build. When a coagulant and a flocculant solution was added to the same oil mud sample both solutions were treated in the same manner and the coagulant solution was always added first.

Immediately after the oil mud/coagulant/flocculant mixtures were mixed, as rapidly as possible, approximately 10 mL of each resultant mixture was poured off into a Corning Model 8080, 15 ml graduated centrifuge tube and placed into a Beckmann—Coulter Allegra X22 centrifuge equipped with an SX4250 Swinging Bucket rotor. Once all the samples from one test run were placed in the centrifuge the samples were rotated at 3,000 rpm (RCF or G=121), for about one hour to allow solid-liquid separation to take place. During this time, at seven equal time intervals, centrifugation was stopped and observations were recorded on each sample. It is noteworthy to point out that the RCF values attainable in oilfield centrifuges is 15-50 times higher than the RCF values used for the laboratory investigations. As well, the retention time in oilfield centrifuges is only in the order of one minute compared to 56-70 minutes for the investigations. However, the RCF, Time products are comparable.

A total of four different flocculants (all containing the same 3 wt % calcium chloride/0.75 g/L hydrated lime solution and five different coagulant solutions were tested in two different test sets and for each test set a blank, only oil mud, sample was tested in the same manner. In the field application the combination of the two inorganic compounds, calcium chloride and hydrated lime were selected as inorganic coagulants because these products were also in the SOBM formulation being used. Furthermore, since Alcomer 24 was onsite and used in the field application, Alcomer 24 was also tested in the laboratory in order that other flocculants could be compared to the Alcomer 24. Similarly, in the coagulant evaluation the combined calcium chloride—hydrated lime inorganic coagulant formulation was used so that it could be compared to the organic coagulants that were used in the laboratory investigation.

Table 7 below summarizes the tests and the following tables and graphs present the results that were obtained from the tests.

TABLE 7

1. The wettability of all drilled solids remained being oil wet for all tests; wettability was not intentionally altered in this process
2. Coagulants or flocculants were mixed with oil mud in 400 mL beakers
3. To mix the coagulants or flocculants with the oil mud the coagulants and flocculants were stirred into the oil mud at 275 rpm in a 20:1 ratio using a Phipps & Bird, Model PB-950 Jar Tester
4. Coagulants and flocculants were stirred into the SOBM at 50 rpm in a 20:1 ratio using a Phipps & Bird, Model PB-950 Jar Tester
5. Centrifuging: Corning Model 8080, 15 ml graduated centrifuge tubes in a Beckmann - Coulter Allegra X22 with SX4250 Swinging Bucket rotor TABLE 7-continued 6. Centrifuge tubes were calibrated for actual vs observed solids fractions and found to be, Actual = 0.5 × Observed
7. The solids volume in the data tables is the maximum possible, actual solids volume
8. Test volume data noted and taken on one side or the other side of the tube graduation, marked accordingly and placed with the graduations facing in the circumferential direction in the centrifuge
9. Typical Oilfield centrifuge G-force is in the range of 1800-5600, i.e., their G-force is 15-50 times higher
10. RCF or G-force = $1.12 \times mm\ Radius \times (RPM/1000)^2$

TABLE 8

COAGULANT TEST DATA @ 3000 rpm (RCF or G = 121)
Test Run No. 1: Effects of Coagulants on Oil Mud Stripping Ability

Oil Mud Only

| Time (min) | Cum. Time | Total Vol. Test Rdg. (ml) | Test Vol. (ml) | Adj. Vol. to 10 ml | Circ. Adj. Adj. Vol. (ml) | Rate (ml/min) | Solid Vol. 1.2 Cum. % Strip'd |
|---|---|---|---|---|---|---|---|
| | | 10.2 | | | −0.025 | | |
| | 0 | 0 | | | | | 0 |
| 10 | 10 | 9.85 | 0.35 | 0.36 | 0.33 | 0.033 | 3.7 |
| 10 | 20 | 9.60 | 0.60 | 0.61 | 0.59 | 0.026 | 6.5 |
| 10 | 30 | 9.30 | 0.90 | 0.92 | 0.89 | 0.031 | 9.9 |
| 10 | 40 | 8.95 | 1.25 | 1.28 | 1.25 | 0.036 | 13.9 |
| 10 | 50 | 8.55 | 1.65 | 1.68 | 1.66 | 0.041 | 18.5 |
| 10 | 60 | 8.05 | 2.15 | 2.19 | 2.17 | 0.051 | 24.2 |
| 10 | 70 | 7.60 | 2.60 | 2.65 | 2.63 | 0.046 | 29.3 |
| | | | | Average Rate (ml/min) | | 0.038 | |
| | | | | Increase in Stripping Rate (%) | | 0.0 | |

Hyperdrill CP644 at 25 ppm

| Time (min) | Cum. Time | Total Vol. Test Rdg. (ml) | Test Vol. (ml) | Adj. Vol. to 10 ml | Circ. Adj. Adj. Vol. (ml) | Rate (ml/min) | Solid Vol. 1.2 Cum. % Strip'd |
|---|---|---|---|---|---|---|---|
| | | 10.2 | | | 0.15 | | |
| | 0 | 0 | | | | | 0 |
| 10 | 10 | 9.85 | 0.35 | 0.36 | 0.51 | 0.051 | 5.6 |
| 10 | 20 | 9.45 | 0.75 | 0.77 | 0.92 | 0.041 | 10.2 |
| 10 | 30 | 9.00 | 1.20 | 1.22 | 1.37 | 0.046 | 15.3 |
| 10 | 40 | 8.60 | 1.60 | 1.63 | 1.78 | 0.041 | 19.9 |
| 10 | 50 | 8.20 | 2.00 | 2.04 | 2.19 | 0.041 | 24.4 |

3 wt % CaCl$_2$ + 0.75 kg/m$^3$ Lime

| Total Vol. Test Rdg. (ml) | Test Vol. (ml) | Adj. Vol. to 10 ml | Circ. Adj. Adj. Vol. (ml) | Rate (ml/min) | Solid Vol. 1.3 Cum. % Strip'd |
|---|---|---|---|---|---|
| 10.5 | | | 0 | | |
| 0 | | | | | 0 |
| 10.20 | 0.30 | 0.32 | 0.32 | 0.032 | 3.4 |
| 9.85 | 0.65 | 0.68 | 0.68 | 0.037 | 7.4 |
| 9.50 | 1.00 | 1.05 | 1.05 | 0.037 | 11.4 |
| 9.15 | 1.35 | 1.42 | 1.42 | 0.037 | 15.3 |
| 8.70 | 1.80 | 1.89 | 1.89 | 0.047 | 20.5 |
| 8.20 | 2.30 | 2.42 | 2.42 | 0.053 | 26.1 |
| 7.70 | 2.80 | 2.94 | 2.94 | 0.052 | 31.8 |
| | | Average Rate (ml/min) | | 0.042 | |
| | | Increase in Stripping Rate (%) | | 11.9 | |

Hyperdrill CP644 at 50 ppm

| Total Vol. Test Rdg. (ml) | Test Vol. (ml) | Adj. Vol. to 10 ml | Circ. Adj. Adj. Vol. (ml) | Rate (ml/min) | Solid Vol. 1.2 Cum. % Strip'd |
|---|---|---|---|---|---|
| 10.1 | | | 0.075 | | |
| 0 | | | | | 0 |
| 9.70 | 0.40 | 0.40 | 0.48 | 0.048 | 5.4 |
| 9.40 | 0.70 | 0.71 | 0.78 | 0.030 | 8.8 |
| 9.00 | 1.10 | 1.11 | 1.19 | 0.040 | 13.3 |
| 8.70 | 1.40 | 1.41 | 1.49 | 0.030 | 16.8 |
| 8.25 | 1.85 | 1.87 | 1.94 | 0.045 | 21.9 |

TABLE 8-continued

COAGULANT TEST DATA @ 3000 rpm (RCF or G = 121)
Test Run No. 1: Effects of Coagulants on Oil Mud Stripping Ability

| Time (min) | | | 7.80 | 2.40 | 2.45 | 2.60 | 0.041 | | 7.75 | 2.35 | 2.37 | 2.45 | 0.051 | 27.5 |
|---|---|---|---|---|---|---|---|---|---|---|---|---|---|---|
| 10 | | | 7.20 | 3.00 | 3.06 | 3.21 | 0.061 | | 7.15 | 2.95 | 2.98 | 3.05 | 0.061 | 34.4 |
| 10 | | | | | verage Rate (ml/min) | | 0.046 | | | | Average Rate (ml/min) | | 0.044 | |
| | | | | | Increase in Stripping Rate (%) | | 22.2 | | | | Increase in Stripping Rate (%) | | 16.3 | |

Hyperdrill CP757 at 25 ppm | | | | | | | | Hyperdrill CP757 at 50 ppm

| Time (min) | Cum. Time | Total Vol. Test Rdg. (ml) 9.4 | Test Vol. (ml) | Adj. Vol. to 10 ml | Circ. Adj. 0.05 Adj... Vol. (ml) | Rate (ml/min) | Solid Vol. 1.1 Cum. % Strip'd | Total Vol. Test Rdg. (ml) 10.2 | Test Vol. (ml) | Adj. Vol. to 10 ml | Circ. Adj. 0.1 Adj... Vol. (ml) | Rate (ml/min) | Solid Vol. 1.2 Cum. % Strip'd |
|---|---|---|---|---|---|---|---|---|---|---|---|---|---|
| 0 | 0 | 0 | | | | | 0 | 0 | | | | | 0 |
| 10 | 10 | 9.00 | 0.40 | 0.38 | 0.43 | 0.043 | 5.1 | 9.90 | 0.30 | 0.31 | 0.41 | 0.041 | 4.5 |
| 10 | 20 | 8.55 | 0.85 | 0.80 | 0.85 | 0.042 | 10.3 | 9.50 | 0.70 | 0.71 | 0.81 | 0.041 | 9.1 |
| 10 | 30 | 8.20 | 1.20 | 1.13 | 1.18 | 0.033 | 14.2 | 9.10 | 1.10 | 1.12 | 1.22 | 0.041 | 13.6 |
| 10 | 40 | 7.85 | 1.55 | 1.46 | 1.51 | 0.033 | 18.2 | 8.75 | 1.45 | 1.48 | 1.58 | 0.036 | 17.6 |
| 10 | 50 | 7.35 | 2.05 | 1.93 | 1.98 | 0.047 | 23.9 | 8.35 | 1.85 | 1.89 | 1.99 | 0.041 | 22.1 |
| 10 | 60 | 6.95 | 2.45 | 2.30 | 2.35 | 0.038 | 28.4 | 7.90 | 2.30 | 2.35 | 2.45 | 0.046 | 27.3 |
| 10 | 70 | 6.50 | 2.90 | 2.73 | 2.78 | 0.042 | 33.6 | 7.40 | 2.80 | 2.86 | 2.96 | 0.051 | 32.9 |
| | | | | Average Rate (ml/min) | | 0.040 | | | | Average Rate (ml/min) | | 0.042 | |
| | | | | Increase in Stripping Rate (%) | | 5.7 | | | | Increase in Stripping Rate (%) | | 12.5 | |

TABLE 9

FLOCCULANT TEST DATA @ 3000 rpm (RCF or G = 121)
Test Run No. 2: Effects of Flocculants with Coagulant on Oil Mud Stripping Ability

Oil Mud Only

| Time (min) | Cum. Time | Total Vol. 11.2 Test Rdg. (ml) | Test Vol. (ml) | Adj. Vol. to 10 ml | Circ. Adj. 0 Adj. Vol. (ml) | Rate (ml/min) | Solid Vol. 1.3 Cum. % Strip'd |
|---|---|---|---|---|---|---|---|
| 0 | 0 | 0 | 0 | | | | 0 |
| 8 | 8 | 10.95 | 0.25 | 0.28 | 0.28 | 0.035 | 2.8 |
| 8 | 16 | 10.55 | 0.65 | 0.73 | 0.73 | 0.056 | 7.4 |
| 8 | 24 | 10.20 | 1.00 | 1.12 | 1.12 | 0.049 | 11.4 |
| 8 | 32 | 9.90 | 1.30 | 1.46 | 1.46 | 0.042 | 14.8 |
| 8 | 40 | 9.50 | 1.70 | 1.90 | 1.90 | 0.056 | 19.3 |
| 8 | 48 | 9.10 | 2.10 | 2.35 | 2.35 | 0.056 | 23.9 |
| 8 | 56 | 8.70 | 2.50 | 2.80 | 2.80 | 0.056 | 28.4 |
| | | | | Average Rate (ml/min) | | 0.050 | |
| | | | | increase in Stripping Rate (%) | | 0.0 | |

Hyperdrill AF 247RD

| Time (min) | Cum. Time | Total Vol. 11 Test Rdg. (ml) | Test Vol. (ml) | Adj. Vol. to 10 ml | Circ. Adj. 0 Adj. Vol. (ml) | Rate (ml/min) | Solid Vol. 1.3 Cum. % Strip'd |
|---|---|---|---|---|---|---|---|
| 0 | 0 | 0 | 0 | | | | 0 |
| 8 | 8 | 10.50 | 0.50 | 0.55 | 0.55 | 0.069 | 5.7 |
| 8 | 16 | 9.90 | 1.10 | 1.21 | 1.21 | 0.082 | 12.5 |
| 8 | 24 | 9.35 | 1.65 | 1.82 | 1.82 | 0.076 | 18.8 |
| 8 | 32 | 8.90 | 2.10 | 2.31 | 2.31 | 0.062 | 23.9 |
| 8 | 40 | 8.25 | 2.75 | 3.03 | 3.03 | 0.089 | 31.3 |
| 8 | 48 | 7.80 | 3.20 | 3.52 | 3.52 | 0.062 | 36.4 |
| 8 | 56 | 7.10 | 3.90 | 4.29 | 4.29 | 0.096 | 44.3 |
| | | | | Average Rate (ml/min) | | 0.077 | |
| | | | | Increase in Stripping Rate (%) | | 53.2 | |

Field Trial, Alcomer 24

| Time (min) | Cum. Time | Total Vol. 11 Test Rdg. (ml) | Test Vol. (ml) | Adj. Vol. to 10 ml | Circ. Adj. 0 Adj. Vol. (ml) | Rate (ml/min) | Solid Vol. 1.3 Cum. % Strip'd |
|---|---|---|---|---|---|---|---|
| 0 | 0 | 0 | 0 | | | | 0 |
| 8 | 8 | 10.50 | 0.50 | 0.55 | 0.55 | 0.069 | 5.7 |
| 8 | 16 | 10.00 | 1.00 | 1.10 | 1.10 | 0.069 | 11.4 |
| 8 | 24 | 9.70 | 1.30 | 1.43 | 1.43 | 0.041 | 14.8 |
| 8 | 32 | 9.10 | 1.90 | 2.09 | 2.09 | 0.083 | 21.6 |
| 8 | 40 | 8.60 | 2.40 | 2.64 | 2.64 | 0.069 | 27.3 |
| 8 | 48 | 8.00 | 3.00 | 3.30 | 3.30 | 0.082 | 34.1 |
| 8 | 56 | 7.60 | 3.40 | 3.74 | 3.74 | 0.055 | 38.6 |
| | | | | Average Rate (ml/min) | | 0.067 | |
| | | | | Increase in Stripping Rate (%) | | 33.6 | |

Hyperdrill NF 201

| Time (min) | Cum. Time | Total Vol. 10.2 Test Rdg. (ml) | Test Vol. (ml) | Adj. Vol. to 10 ml | Circ. Adj. 0 Adj. Vol. (ml) | Rate (ml/min) | Solid Vol. 1.2 Cum. % Strip'd |
|---|---|---|---|---|---|---|---|
| 0 | 0 | 0 | 0 | | | | 0 |
| 8 | 8 | 9.80 | 0.40 | 0.41 | 0.41 | 0.051 | 4.5 |
| 8 | 16 | 9.40 | 0.80 | 0.82 | 0.82 | 0.051 | 9.1 |
| 8 | 24 | 9.00 | 1.20 | 1.22 | 1.22 | 0.051 | 13.6 |
| 8 | 32 | 8.50 | 1.70 | 1.73 | 1.73 | 0.064 | 19.3 |
| 8 | 40 | 8.05 | 2.15 | 2.19 | 2.19 | 0.057 | 24.4 |
| 8 | 48 | 7.50 | 2.70 | 2.75 | 2.75 | 0.070 | 30.7 |
| 8 | 56 | 7.15 | 3.05 | 3.11 | 3.11 | 0.045 | 34.7 |
| | | | | Average Rate (ml/min) | | 0.056 | |
| | | | | Increase in Stripping Rate (%) | | 11.1 | |

Hyperdrill CP 911

| Time (min) | Cum. Time | Total Vol. 10 Test Rdg. (ml) | Test Vol. (ml) | Adj. Vol. to 10 ml | Circ. Adj. 0 Adj. Vol. (ml) | Rate (ml/min) | Solid Vol. 1.2 Cum. % Strip'd |
|---|---|---|---|---|---|---|---|
| 0 | 0 | 0 | 0 | | | | 0 |
| 8 | 8 | 9.60 | 0.40 | 0.40 | 0.40 | 0.050 | 4.5 |
| 8 | 16 | 9.10 | 0.90 | 0.90 | 0.90 | 0.063 | 10.2 |
| 8 | 24 | 8.50 | 1.50 | 1.50 | 1.50 | 0.075 | 17.0 |
| 8 | 32 | 8.10 | 1.90 | 1.90 | 1.90 | 0.050 | 21.6 |
| 8 | 40 | 7.45 | 2.55 | 2.55 | 2.55 | 0.081 | 29.0 |
| 8 | 48 | 7.00 | 3.00 | 3.00 | 3.00 | 0.056 | 34.1 |
| 8 | 56 | 6.45 | 3.55 | 3.55 | 3.55 | 0.069 | 40.3 |
| | | | | Average Rate (ml/min) | | 0.063 | |
| | | | | Increase in Stripping Rate (%) | | 26.8 | |

All the coagulant data are summarized in FIG. 3 and FIG. 4 below.

For the coagulants, reference FIG. 3, it was observed that for all of them the initial stripping rates were lower than the stripping rates for the final 30 minutes over which the data were taken. Therefore, since lower retention times are more relevant in oilfield stripping operations, the average stripping rates taken over the first 40 minutes are used to compare the flocculants and the results of these analyses are presented in FIG. 4. With reference to FIG. 4, it can be seen that the inorganic coagulant formulation did not perform as well as either of the organic coagulants. This suggests that stripping can be significantly improved (at least threefold) when the proper organic coagulant is chosen.

Of the two organic coagulants that were investigated, Hyperdrill CP 644, a poly(DADMAC) that very significantly outperformed the inorganic coagulants used for the filed application, also significantly outperformed the polyquaternary amine, (Hyperdrill 757), which possibly, had not yet reached its optimum concentration at 50 ppm. On the other hand, for CP 644 the optimum concentration was exceeded after only 25 ppm and its ability to coagulate the Marcellus Shale LGS was 3.2 times that of the inorganic coagulant used for the field application. With reference to the flocculant effectiveness, FIG. 6, the anionic flocculant of higher anionicity, Hyperdrill AF 247RD, was 1.6 times that of less anionic Alcomer 24 that was used for the field application.

Therefore, by virtue the fact that,
- the poly(DADMAC) significantly outperformed the inorganic coagulants,
- the poly(DADMAC) outperformed the polyquaternary amine at a lower concentration,
- the poly(DADMAC) and the polyquaternary amine are approximately equally priced, and
- the 100% cationic poly(DADMAC) is also very synergistic with the better performing, more anionic flocculant having an anionicity of 30%, i.e., Hyperdrill AF 247RD:

It is concluded that Hyperdrill CP 644, a poly(DADMAC) with a cationicity of 100% and an MW of approximately 200,000 is a preferred coagulant for use in the process of the present invention.

The flocculant data are summarized in FIG. 5 and FIG. 6 below.

For all the flocculants, their stripping rate was constant and linear over the time the data were taken. With reference to FIG. 6, the 30% anionic Hyperdrill AF 247RD, significantly outperformed the low anionic Alcomer 24 (1.6 fold), the non-ionic NF 201 (5 fold) and the 70% cationic CP 911 (2 fold).

The anionicity and the MW of BASF's Alcomer 24 were not provided by the manufacturer. However, it is estimated that Alcomer 24 has a low anionicity in the range of 8-15% and a low/medium molecular weight would be in the range of 5,000,000-7,000,000 g/mole.

Based on the flocculants that were evaluated in this laboratory investigation it is concludes that a flocculant like Hyperdrill 247 RD, a homopolymer of acrylamide copolymerized with a sodium salt of polyacrylic acid having an anionicity of 30% and MW of 5,000,000 is the preferred flocculant to use for the process of the present invention.

Table 10 below summarizes the improvement that Hyperdrill CP644 and Hyperdrill AF 247 make relative to coagulant and flocculant used in the Lycoming

TABLE 10

| Field Application | Laboratory Investigation | Improvement (%) |
|---|---|---|
| 3 wt % calcium chloride + 0.75 g/L hydrated lime | Hyperdrill CP 644 | 230 |
| Alcomer 24 | Hyperdrill AF 247 RD | 56 |

Using the available coagulants and flocculant at the time, the field application of the process of the present invention demonstrated that the time required to reduce the LGS in oil muds to more than typically acceptable levels was approximately 50% less than the time required using then current methods. With reference to Table 10 it is not unreasonable to predict that, with the proper combination of coagulant and flocculant, the process of the present invention can further reduce the time required for drilled solids in oil muds to be reduced to acceptable levels that would enable the re-use of solids laden Oil Muds to 65-75%. Such a significant improvement will at least equally and significantly reduce drilling operational costs for shale gas drilling and any other drilling operations that use oil muds worldwide. Equally so, the environmental footprint of drilling operations that incorporate oil muds will also be reduced when the process of the present invention is applied.

Various modifications can be made in the details of the various embodiments of the processes and apparatuses of the present invention, all within the scope and spirit of the invention and defined by the appended claims.

The invention claimed is:

1. A process for treating hydrocarbon phase continuous drilling fluids, the process comprising:
   (a) providing an input hydrocarbon phase continuous drilling fluid having a continuous hydrocarbon phase, a discontinuous aqueous phase, and a discontinuous particulate solids phase, the input hydrocarbon phase continuous drilling fluid having an oil-to-water weight ratio,
   (b) providing at least one polymer solution,
   (c) providing at least one coagulant, wherein said polymer solution includes water or said coagulant is dissolved or suspended in an aqueous medium,
   (d) providing base oil, the base oil being provided in such quantity as to maintain the oil-to-water weight ratio of the input hydrocarbon phase continuous drilling fluid being treated,
   (e) mixing the input hydrocarbon phase continuous drilling fluid, the polymer solution, the coagulant, and the base oil to provide an input fluid,
   (f) providing the input fluid to a decanting centrifuge,
   (g) centrifuging the input fluid to separate particulate solids from the input fluid to provide a treated hydrocarbon phase continuous drilling fluid,
   wherein no step is taken to alter the wettability of the discontinuous particulate solids phase.

2. A process according to claim 1 wherein any added water is being provided by water included in either the at least one polymer solution, the at least one coagulant, or both.

3. A process according to claim 1 wherein the at least one polymer solution comprises a polymeric flocculant dissolved in an aqueous medium.

4. A process according to claim 3 wherein the aqueous medium including the polymeric flocculant is injected into the centrifuge at a rate of up to about 5 liters per minute.

5. A process according to claim 3 wherein the flocculant is selected from the group consisting of polyacrylamides, copolymers of acrylamide and sodium acrylate, and dimethylaminoethyl acrylate methyl chloride.

6. A process according to claim 3 wherein the aqueous medium including the polymeric flocculant is added to the input hydrocarbon phase continuous drilling fluid in the ratio of up to about 1:20.

7. A process according claim 1 wherein the coagulant is dissolved or suspended in an aqueous medium.

8. A process according to claim 7 wherein the aqueous medium including the coagulant is injected into the centrifuge at a rate of up to about 5.37 liters per minute.

9. A process according to claim 7 wherein the aqueous medium including the coagulant is added to the input hydrocarbon phase continuous drilling fluid in the ratio of up to about 1:20.

10. A process according to claim 1 wherein the discontinuous particulate solids phase discharged from the decanting centrifuge comprises oil-wet particulate.

11. A process according to claim 10 wherein the wettability of the oil-wet particulate discharged from the centrifuge is substantially the same as the oil-wet particulate solids phase of the input hydrocarbon phase continuous drilling fluid.

12. A process according to claim 1 further comprising the step of providing the treated hydrocarbon phase continuous drilling fluid to an active drilling system.

13. A process according to claim 1 wherein the process is carried out continuously.

14. A process according to claim 1 wherein the process is carried out in a batch mode.

15. A process according to claim 1 wherein the input fluid is provided to the centrifuge at a rate from about 250 to about 400 liters per minute.

16. A process according to claim 1 wherein the coagulant is selected from the group consisting of hydrated lime, calcium chloride, and mixtures thereof.

17. A process according to claim 1 wherein the coagulant is selected from the group consisting of aqueous solutions, dispersions, or emulsions of polydiallyldimethylammonium chlorides and polyquaternary amines.

18. A process according to claim 1 wherein the coagulant is dissolved or suspended in an aqueous medium, wherein the at least one polymer solution comprises a polymeric flocculant dissolved in an aqueous medium, and wherein the aqueous medium including the coagulant and the aqueous medium including the polymeric flocculant are added to the input hydrocarbon phase continuous drilling fluid such that the ratio of the input hydrocarbon phase continuous drilling fluid to the total of the aqueous medium including the coagulant and the aqueous medium including the polymeric flocculant is in the range of from about 10:1 to about 100:1.

19. Apparatus for treating hydrocarbon phase continuous drilling fluids, the apparatus comprising:
  (a) a feed pump for receiving drilling fluid to be treated,
  (b) a centrifuge, the feed pump being operatively connected to the input to the centrifuge through a feed line operatively connected to a mud tank of an active hydrocarbon phase continuous drilling fluid system,
  (c) a return line operatively connected to the centrifuge which returns its treated hydrocarbon phase continuous drilling fluid stream back to the mud tank of the active drilling system,
  (d) a tank for storing base oil, the tank for storing base oil being operatively connected to the feed pump, or the feed line, or the input to the centrifuge for delivering base oil to the centrifuge,
  (e) a tank for storing coagulant, the tank for storing coagulant being operatively connected to the feed pump, or the feed line, or the input to the centrifuge for delivering coagulant to the centrifuge, and
  (f) a tank for storing flocculant, the tank for storing flocculant being operatively connected to the feed pump, or the feed line, or the input to the centrifuge for delivering flocculant to the centrifuge,
  wherein there is no mixer between an outlet of the tank for storing flocculant and the centrifuge.

20. Apparatus according to claim 19 wherein the flocculant is injected into the feed line to the centrifuge at some point downstream from where the coagulant and the base oil enter the drilling fluid to be treated.

21. Apparatus according to claim 19 further comprising a holding tank operatively connected to the feed pump for delivering drilling fluid to be treated to the input of the centrifuge.

* * * * *

UNITED STATES PATENT AND TRADEMARK OFFICE
CERTIFICATE OF CORRECTION

| | | |
|---|---|---|
| PATENT NO. | : 9,561,452 B2 | Page 1 of 1 |
| APPLICATION NO. | : 14/401591 | |
| DATED | : February 7, 2017 | |
| INVENTOR(S) | : H. Udo Zeidler | |

It is certified that error appears in the above-identified patent and that said Letters Patent is hereby corrected as shown below:

In the Specification

Column 16, after Line 10, after Table 7, insert the following paragraph:
-- All the data taken for the coagulant evaluation is presented in Table 8 below and the flocculant evaluation is presented in Table 9. --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*